United States Patent
Matsui et al.

(10) Patent No.: US 12,263,963 B2
(45) Date of Patent: Apr. 1, 2025

(54) CIRCULAR MASS ACCELERATOR FOR OFF-WORLD APPLICATIONS

(71) Applicant: SpinLaunch Inc., Long Beach, CA (US)

(72) Inventors: Bruno Matsui, Long Beach, CA (US); Mark Sipperley, Long Beach, CA (US); Maxim Clarke, Long Beach, CA (US); Jonathan Yaney, Long Beach, CA (US)

(73) Assignee: SpinLaunch Inc., Long Beach, CA (US)

( * ) Notice: Subject to any disclaimer, the term of this patent is extended or adjusted under 35 U.S.C. 154(b) by 163 days.

(21) Appl. No.: 18/188,396

(22) Filed: Mar. 22, 2023

(65) Prior Publication Data
US 2024/0076063 A1 Mar. 7, 2024

Related U.S. Application Data

(60) Provisional application No. 63/404,345, filed on Sep. 7, 2022.

(51) Int. Cl.
*B64G 1/40* (2006.01)
*B64G 1/00* (2006.01)

(52) U.S. Cl.
CPC ............. *B64G 1/409* (2013.01); *B64G 1/002* (2013.01)

(58) Field of Classification Search
CPC ........ B64G 1/409; B64G 1/002; B64G 1/641; B64G 1/646; B64G 1/648; B64G 5/00
See application file for complete search history.

(56) References Cited

U.S. PATENT DOCUMENTS

| | | | | |
|---|---|---|---|---|
| 1,686,298 A | * | 10/1928 | Uhl | B64F 1/04 472/27 |
| 1,748,663 A | * | 2/1930 | Tucker | B64F 1/04 244/110 F |
| 1,842,432 A | * | 1/1932 | Stanton | B64F 1/04 244/110 F |
| 1,856,446 A | * | 5/1932 | Vingheroets | B64F 1/04 244/137.1 |
| 3,989,206 A | * | 11/1976 | Gregory | B64F 1/06 244/63 |

(Continued)

FOREIGN PATENT DOCUMENTS

| | | | | |
|---|---|---|---|---|
| WO | WO-2006088584 A2 | * | 8/2006 | ............ B64G 1/002 |
| WO | WO-2019164472 A1 | * | 8/2019 | ............... B64F 1/04 |
| WO | WO-2024157057 A1 | * | 8/2024 | |

*Primary Examiner* — Assres H Woldemaryam
(74) *Attorney, Agent, or Firm* — Carr & Ferrell LLP

(57) ABSTRACT

Circular mass accelerators for off-world applications are disclosed herein. An example system includes a base assembly that is configured to interface with a supporting surface, a vertical support assembly extending from the base assembly, a first drive positioned, a shaft connected to the first drive, a hub assembly having a spool, the hub assembly being coupled to a second drive that is located on a terminal end of the shaft, a first tether and a second tether that can be spooled onto and unspooled from the spool by the second drive, and payloads positioned each of the tethers, the payloads being releasably coupled to tethers in such a way that the payloads can be released upon the payloads being rotated to a target launch velocity.

20 Claims, 11 Drawing Sheets

(56) References Cited

U.S. PATENT DOCUMENTS

| | | | | |
|---|---|---|---|---|
| 4,709,883 | A * | 12/1987 | Giuliani | B64F 1/04 244/114 R |
| 10,730,640 | B2 * | 8/2020 | Plisic | B64F 1/04 |
| 2003/0221867 | A1 * | 12/2003 | Westmeyer | E21B 7/00 175/19 |
| 2018/0194496 | A1 * | 7/2018 | Yaney | B64G 1/005 |
| 2018/0237171 | A1 * | 8/2018 | Yaney | F41B 3/04 |

* cited by examiner

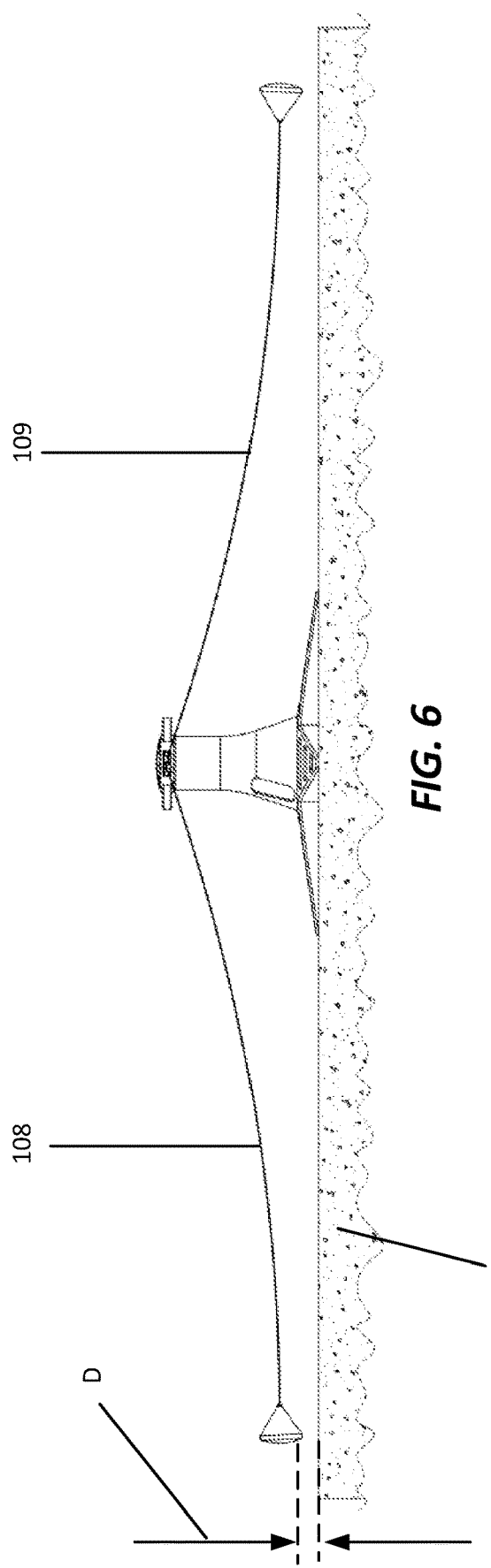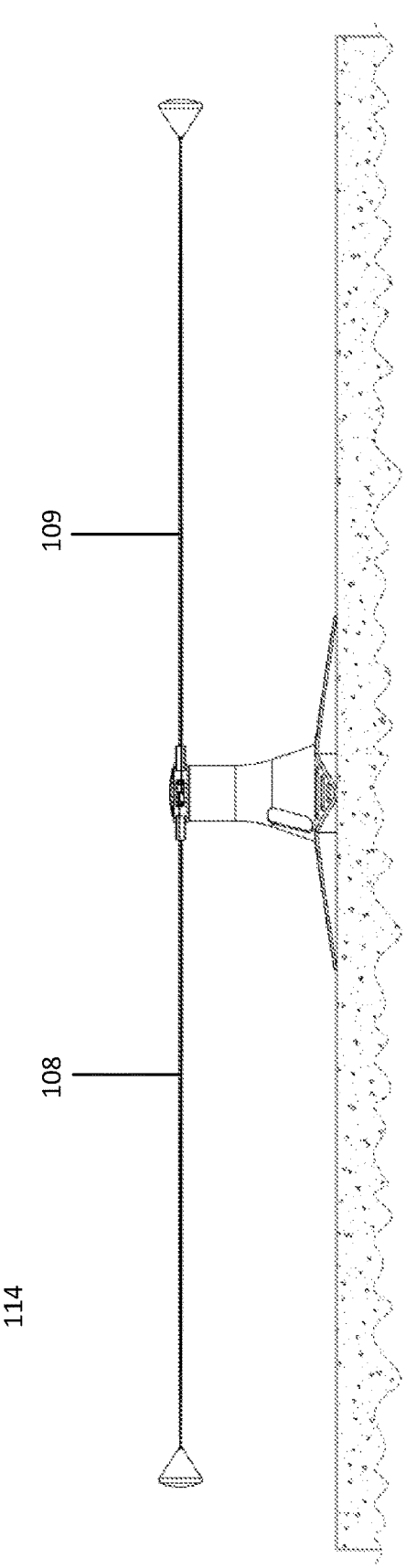

CIRCULAR MASS ACCELERATOR FOR OFF-WORLD APPLICATIONS

CROSS-REFERENCE TO RELATED APPLICATIONS

This application claims the benefit and priority of U.S. Provisional Application Ser. No. 63/404,345, filed on Sep. 7, 2022, which is hereby incorporated herein by reference, including all references and appendices cited therein, for all purposes, as if fully set forth herein.

FIELD OF TECHNOLOGY

This application pertains to systems and methods for launching payloads in off-world applications.

SUMMARY

According to some embodiments, the present disclosure pertains to a system having a base assembly that is configured to interface with a supporting surface, a vertical support assembly extending from the base assembly, a first drive, a shaft connected to the first drive, a hub assembly having a spool, a second drive that is coupled to the spool, a first tether and a second tether that can be spooled onto and unspooled from the spool by the second drive, and payloads positioned each of the tethers, the payloads being releasably coupled to the tethers in such a way that the payloads can be released upon the payloads being rotated to a target launch velocity.

According to some embodiments, the present disclosure pertains to a system having a first drive coupled with a shaft; a second drive coupled to a spool; a first tether and a second tether that can be spooled onto and unspooled from the spool by the second drive; and payloads coupled to each of the first tether and the second tether, the payloads being releasably coupled the first tether and the second tether in such a way that the payloads can be released upon the payloads being rotated to a target launch velocity, the hub assembly is sized to maximize overall rotordynamic stability of the system when the first tether and the second tether are extended.

According to some embodiments, the present disclosure is directed to a system comprising a first drive coupled with a shaft, a hub assembly comprising a spool and docking ports, the hub assembly is coupled to a second drive that is located on a terminal end of the shaft, a first tether, a second tether, a first payload that is releasably associated with the first tether, a second payload that is releasably associated with the second tether, a first docking port that is configured to receive the first payload, a second docking port that is configured to receive the second payload, a controller having a processor and memory, the processor executing instructions stored in the memory to transmit a signal to the first drive to rotate to a threshold velocity; determine when the first payload and the second payload are being rotated at a threshold velocity; cause the first docking port and the second docking port to release the first payload and the second payload when the payloads are being rotated at the threshold velocity; cause the second drive to unspool the first tether and the second tether from the spool; cause the first drive to accelerate to a target velocity; determine when the first payload and the second payload are being rotated at the target velocity and that the first payload and the second payload are at a target launch azimuth based on an angular position; and cause release mechanisms of the first tether and the second tether to release the first payload and the second payload.

BRIEF DESCRIPTION OF DRAWINGS

Exemplary embodiments are illustrated by way of example and not limitation in the figures of the accompanying drawings, in which like references indicate similar elements.

FIGS. 6 and 7 collectively illustrate various rotation states of an example accelerator system.

DETAILED DESCRIPTION

Overview

Figure 1:
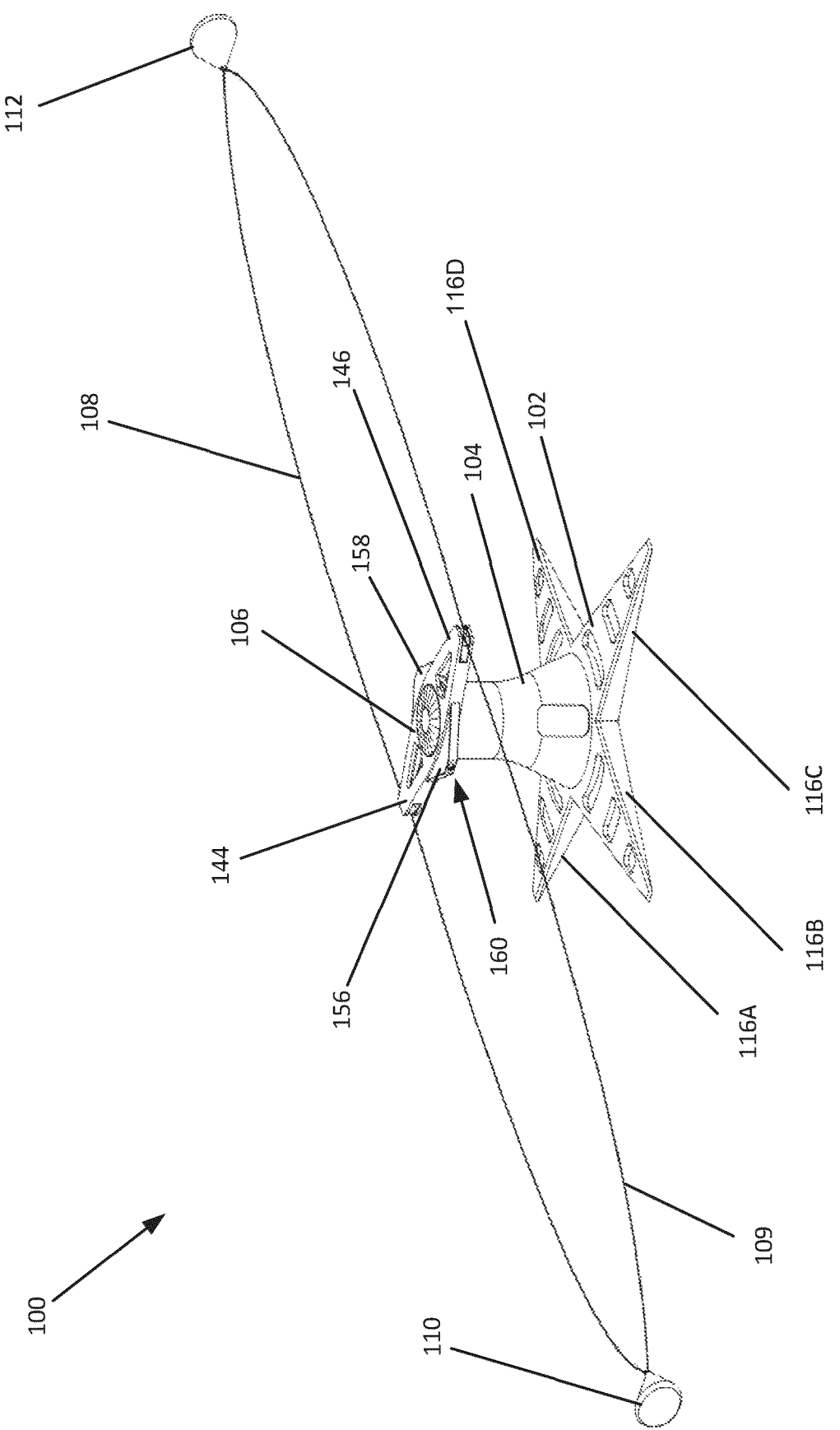
FIG. 1 is an example accelerator system where aspects of the present disclosure can be implemented for use.

An optimized circular mass accelerator for off-world applications and methods of use are disclosed. One example embodiment allows for very large rotation radii while remaining compact and lightweight enough for space transportation missions. Examples designs employ long, flexible tethers which can be condensed and extended during transportation or launch operations. Payloads can be launched using these tethers as they are rotated. As the system's rotational velocity increases, the velocity of the object at the end of the tether also increases. Once a desired velocity is reached, the object is released. A trussed configuration allows for the system to remain stable at very large radii. The entire system is either anchored onto a planetary body with a rarified atmosphere or another stabilized counterrotating circular mass accelerator.

Example Embodiments

Off-world-based circular mass accelerator infrastructure may permit the expansion of the space industry. Due to the fundamental nature of rocket propulsion, the propellant required to send and return mass from off-world bases within reasonable timeframes increases exponentially with travel distance. As such, the logistical difficulty of interplanetary rocket travel increases dramatically as the distance from Earth increases, especially when escaping local gravity wells. Propellants can be manufactured at a destination for a return, but these chemical plants are typically complex to deploy and operate. And in many cases, the necessary reagents for the manufacture of such propellants are not available. The alternative is to deploy a compactable ground-based electrically powered mass accelerator which can be continuously re-used at a destination body or orbital location to provide a velocity impulse boost and minimize the amount of propellant needed to travel within interplanetary space. Analogs can be drawn from the United States railroad system. Both are large infrastructure projects that enable high-speed and efficient travel across vast distances at a previously unattainable level.

Any off-world base, either on orbit or anchored on another planetary body, would benefit greatly specifically from a circular mass accelerator, which is a type of accelerator architecture that can provide a significant velocity boost to sizable payloads at extremely low power requirements using no propellant. Only electrical energy is required, utilized in a relatively simple mechanical system. Circular mass accelerators reduce power requirements by providing an essentially infinite amount of distance for a payload to accelerate over, meaning that payloads can reach their target velocity over an arbitrary amount of time and distance without restriction from construction cost and size. This is contrasted with linear accelerators, where infeasibly long track distances are needed to provide similar low power requirements for equivalent speeds. Minimizing the maximum power draw of space-based infrastructure is crucial for the feasibility of its operation. While applications for this concept have been discussed for the earth, the technology can be adapted and optimized for use in off-world environments, both in orbit and on planetary objects without significant atmospheres. The lack of an atmosphere in these applications eliminates the need for a vacuum chamber, enabling extremely high rotation radii with a minimal economic penalty. Large rotation radii minimize the centripetal forces on the payloads for meaningful launch velocities, minimizing structural penalties on these payloads.

However, complexities arise in the transportation and deployment of such large-radius circular mass accelerators and are compounded by the added constraints of space travel. While on-site construction is an option, it requires a substantially more established presence on the site and is typically logistically prohibitive for effective widespread deployment. As such, an easily compactable and deployable solution is needed for an optimized configuration.

Additionally, rotordynamic stability issues arise with such large rotation radii (e.g., extended tethers with payloads attached thereto). If the circular mass accelerator's tethers are not stiff enough in its in-plane bending direction, the centripetal acceleration field can cause the tethers' armatures to geometrically shift substantially off their original central line, creating an increasing imbalance and driving greater loads to the bearings, thus amplifying power losses. In some cases, if the accelerator is not configured properly, the displacement behavior can go unstable, leading to a complete structural failure of the system. The systems and methods disclosed herein may incorporate a configuration that allows for the stable maximization of this rotation radius while maintaining a rocket-launchable packing factor.

Some embodiments include two tethers, one for each payload/counterweight. An example tether can include a flexible laminate or braid of high-strength polymers or carbon fibers. The tethers extend through the center of a spool and in between two off-center pins. The spool rests on bearings and can rotate independently of the rotation rate of the hub. A high torque drive system is attached and can rotate the spool to pull in the length of the flexible tether by wrapping it around the pins, condensing it into a highly compact form factor. In an unfurling procedure, it also has enough torque to resist the centripetal forces pulling the tethers outwards, allowing them to gradually extend in a controlled manner while the system is still rotating. The spool pins also contain clips that attach to the tethers, eliminating any incidental sliding during maneuvers where the tethers are lightly loaded, ensuring the alignment of the tethers are maintained deterministically.

As the tethers extend outwards past the center of the spool, they are redirected around pairs of guides at the end of the two armatures of the hub. The guides enable the controlled extension and retraction of the tethers without undesired slippage. The guides could also be replaced with independent pulleys to minimize wear on the tethers.

In some embodiments, the armatures are triangular in shape. The base of each of the armatures nearest the central axis of the spool are wide to provide axial stiffness and contribute to the overall stability of the system due to a frictional lockup between the tethers and the guides.

Additionally, the guides that redirect the tethers at the end of the hub are offset from the centerline, biasing the fixture point of each tether slightly outwards in the extension axis. This offset enables each arm of the tether to naturally stabilize at the maximum outward position once fully extended and before the tether has enough tension for friction to keep it from sliding on the guides. Without this offset, the spool would have to resist substantial loads to maintain the alignment of each tether arm as it would tend to rotate orthogonally from the extension axis when the frictional interface between the tether arm and guide is not fully locked.

The tether extends out radially past the guides and terminates at opposing connection points. A connection point can be attached to an object, such as a payload, to be launched. A tether can be tapered along its length to maximize its structural efficiency and minimize mass. Due to the extreme environments typically encountered in space applications, the tether may be covered with a protective and replaceable sleeve to resist the damage inflicted by any abrasive regolith or intense direct stellar radiation that may be present in the local environment.

The hub assembly can be coupled onto a hollowed shaft which is supported by bearings, for example. The hollowed shaft provides space for a second drive/high torque drive which enables the tether extension/retraction capability. The bearings are tightly sealed to resist contamination from abrasives that may be present in the local environment. Supporting the bearings is the base structure, which is also hollowed to provide space for the main drive train and any other auxiliary equipment. The base structure is attached to the anchoring body through a series of drill-in anchors or bolts. The base structure width is large enough to maintain stability during the system's operation. The structure has a vertical support assembly that is elevated enough to provide sufficient vertical clearance between the tether and the ground during the spin-up and spin-down operations. It can be sent separately or in a collapsed configuration to improve volumetric efficiency.

A launch operation begins with the attachment of two, launch-ready objects, one on each tether. Both objects can be useful payloads, or one can be an expendable counterweight. When in the presence of a local gravity field, loading operations begin with the tether slightly spooled out and the attachment point resting on the surface of the local body. The objects are then attached to the tethers via a release mechanism.

Once the objects are attached, some external infrastructure or internal winch lifts the objects off the surface of the anchoring body in the opposite direction of the gravity field. The objects are then locked onto the hub's docking ports and supported mechanically while the system is not rotating at a significant speed. For applications in a microgravity environment, such as in orbit or on a small asteroid, the reloading procedure would likely make use of a rigid articulating arm to capture and maneuver the objects into their launch positions. Once the objects are secured, the main drive system is enabled, and the entire hub, shaft, spool, and tether system begins to rotate. As the system accelerates, the centripetal forces increase to a critical value such that the launched objects and tether will not recontact the base structure. At this point, the objects are released from the docking port and only the tether supports the objects.

The next phase consists of a slow acceleration of the system and unspooling of the tethers. The main drive system can accelerate the entire hub, shaft, and payload system, limited only by the available power. Meanwhile, the tether spool is slowly unwound, allowing the centripetal acceleration to pull the payloads outwards, increasing the exposed length of the tethers. The tethers are unspooled at a rate to maintain a minimum clearance between the end of each tether and the ground surface. This process of unfurling and accelerating will continue until the tethers are fully extended. The capstan friction around the spool pins maintains the positional stability of the individual tethers.

Once the tethers are fully extended, the clips that attach the tether armatures to the spool pins provide a minor stabilization force required to maintain alignment of the tether armatures until the hub pins become frictionally locked with the armatures. After the system is fully extended and stable, the system can continue to accelerate to the target launch velocity.

The system is ready to launch as soon as the target velocity is reached. A sensor tracks the angular position of the payloads. As the payload rotates to the target launch azimuth, the release mechanisms are activated, and the objects are released simultaneously.

The objects then proceed on a ballistic ascent trajectory up toward the apogee. If a propulsion system is on board the payload, it can ignite at any portion of the flight to either raise the orbital periapsis, achieve escape velocity, change orbital inclination, or perform any other orbital maneuver.

After release, the main drive can be inverted such that it acts as a generator, slowing the system down and recovering a large fraction of the energy stored in the rotating mass of the accelerator, storing it into either a large electrochemical energy storage bank or another accelerator. If a higher-power, more efficient generator system than the main drive system is installed, that system can be engaged instead to transform the energy into a high-power electric surge for some local physical process, such as the ignition of a fusion reactor. Energy sources capable of high-power delivery rates are especially difficult to construct with respect to off-world bases.

As the system decelerates, it continuously spools in the tethers such that the tips of the tethers maintain only a reasonable amount of clearance to the ground surface. In other words, the spool drive retracts the maximum radius to maintain the same proportion of centripetal acceleration to local linear acceleration to minimize winch-in loads.

For applications without a sufficiently massive inertial anchor to react to the rotation torque, a counterrotating launch system can be mated to the base of the launch system. This dual launch system would require substantial attitude control systems to maintain stability. When the system is used to release two useful payloads, and the end objective is to rendezvous with an orbiting body, some propellant onboard the payload that is released in the retrograde motion can be expended at apogee to reverse the direction of an elliptical orbit to a prograde direction with a minimal fuel penalty, providing two useful payloads in similar orbits from a singular launch operation.

Figure 2:
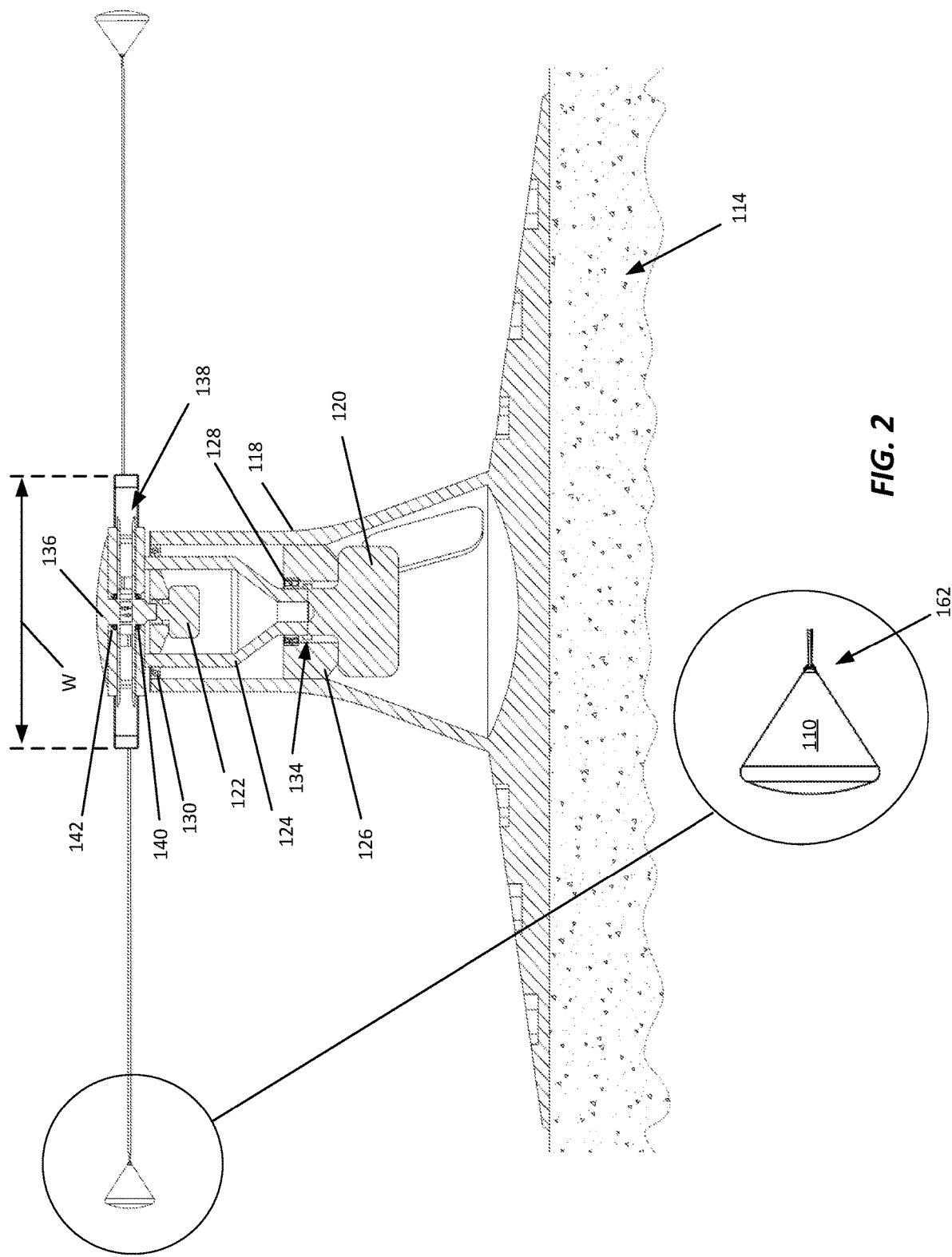
FIG. 2 is a cross-sectional view of an example accelerator system.

FIG. 1 illustrates a perspective view of an example accelerator system (hereinafter "system 100"). In one embodiment, the system 100 comprises a base assembly 102, a vertical support assembly 104, a hub assembly 106, a first tether 108, a second tether 109, a counterweight 110, and a payload 112. In general, the system 100 is configured to launch a payload 112, as will be discussed in greater detail herein. As best illustrated in FIG. 2, the system 100 can be mounted to a surface 114 such as a planetary body with a rarified atmosphere or another stabilized counterrotating circular mass accelerator (see FIG. 8 as an example). The system can be associated with any support surface.

The base assembly 102 can comprise a plurality of feet 116A-116D, which are arranged in such a way as to provide vertical stability to the system 100 and also to provide a wide footprint and large surface area with the surface 114 (again, see FIG. 2). While the base assembly 102 has been illustrated and described with a specific configuration, it will be understood that this configuration is not intended to be limiting unless claimed as such. Other various base assembly configurations that would be known to one of ordinary skill in the art may also be used in accordance with the present disclosure.

Referring now to FIG. 2, the vertical support assembly 104 comprises a housing 118, a first drive 120, a second drive 122, a shaft 124, a mount 126, a first rotation member 128, and a second rotation member 130. The first drive 120 can be rotatably coupled to the shaft 124 and supported by the mount 126. In some embodiments, the mount 126 extends between an inner surface of the housing 118 and an outer surface of the first drive 120 and the shaft 124. The shaft is rotatably secured and supported by the first rotation member 128. The first rotation member 128 could be a race bearing that is incorporated into a body of the mount 126. In some embodiments, the mount 126 includes a circumferential groove or notch 134 that is located at the interface between the first drive 120 and the shaft 124. This configuration allows the first drive 120 to be fixedly attached to the mount 126, while the shaft 124 is permitted to rotate inside the first rotation member 128. The shaft 124 can be rotatably supported by the second rotation member 130 at a terminal or upper end of the housing 118 of the vertical support assembly 104. The second rotation member 130 can include a race bearing or other similar rotation support. Thus, the shaft 124 can rotate about both the first rotation member 128 and the second rotation member 130.

In some embodiments, the shaft 124 is a tapered unit that angles to its terminal end that mates with the first drive 120. The shaft 124 has a cylindrical portion, a tapered conical portion, and a cylindrical neck that meets with the first drive 120. The second drive 122 is located on an opposing side the shaft 124 from the first drive 120. In one embodiment, the hub assembly 106 is fixed to the rotation of the shaft 124.

The spool 138 rotates independently of the shaft 124 and manages the length of the tethers.

The hub assembly 106 is positioned above the second drive 122 and supported at a terminal end of the shaft 124. The hub assembly 106 generally comprises a hub 136 and a spool 138 that can be rotatably supported by bearings 140 and 142 or other similar rotatable supports. In some embodiments, spool 138 can rotate independently of the rotation rate of the hub 136.

Figure 3:
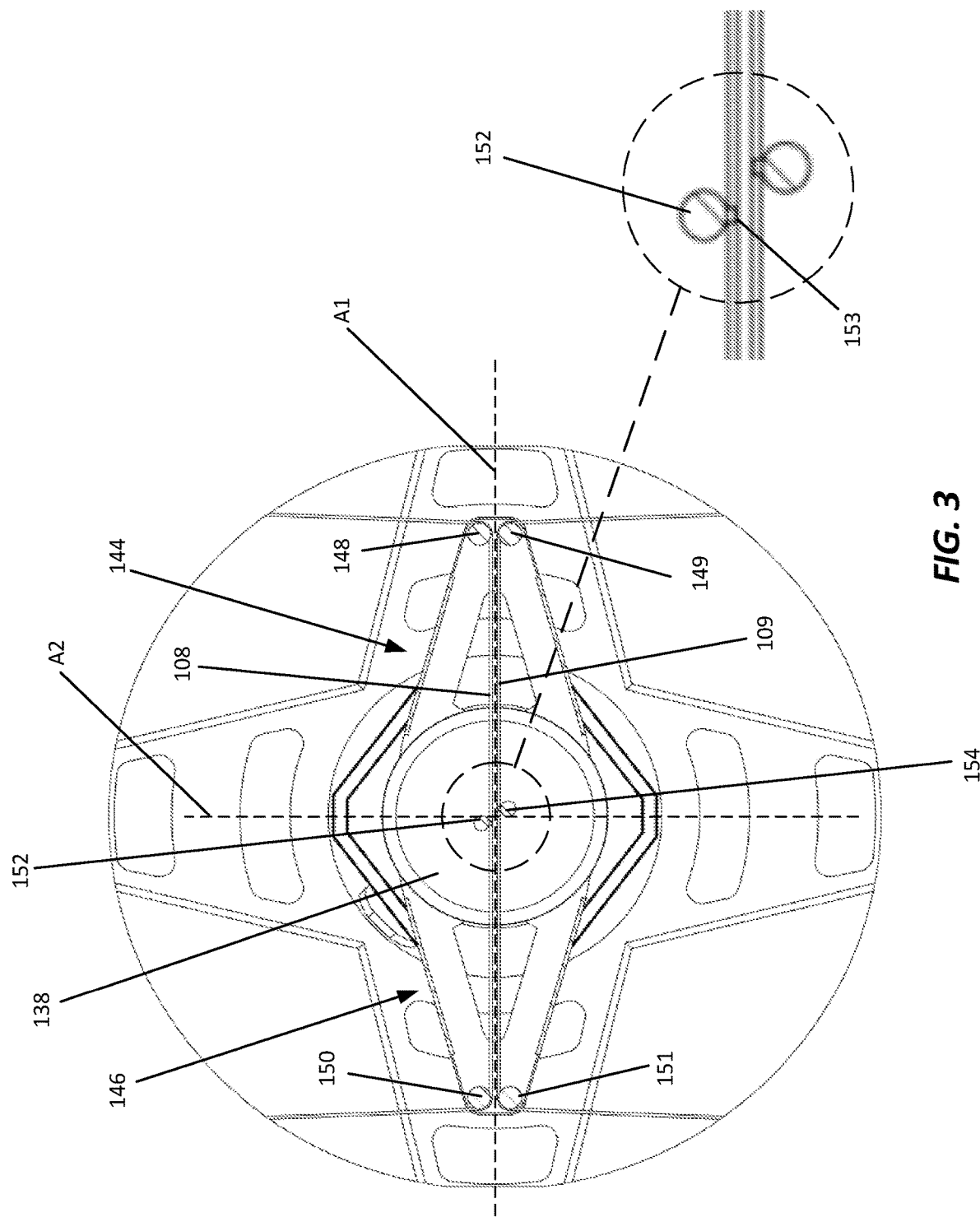
FIGS. 3 and 4 collectively illustrate a hub assembly having a spool that receives tethers.
Figure 4:
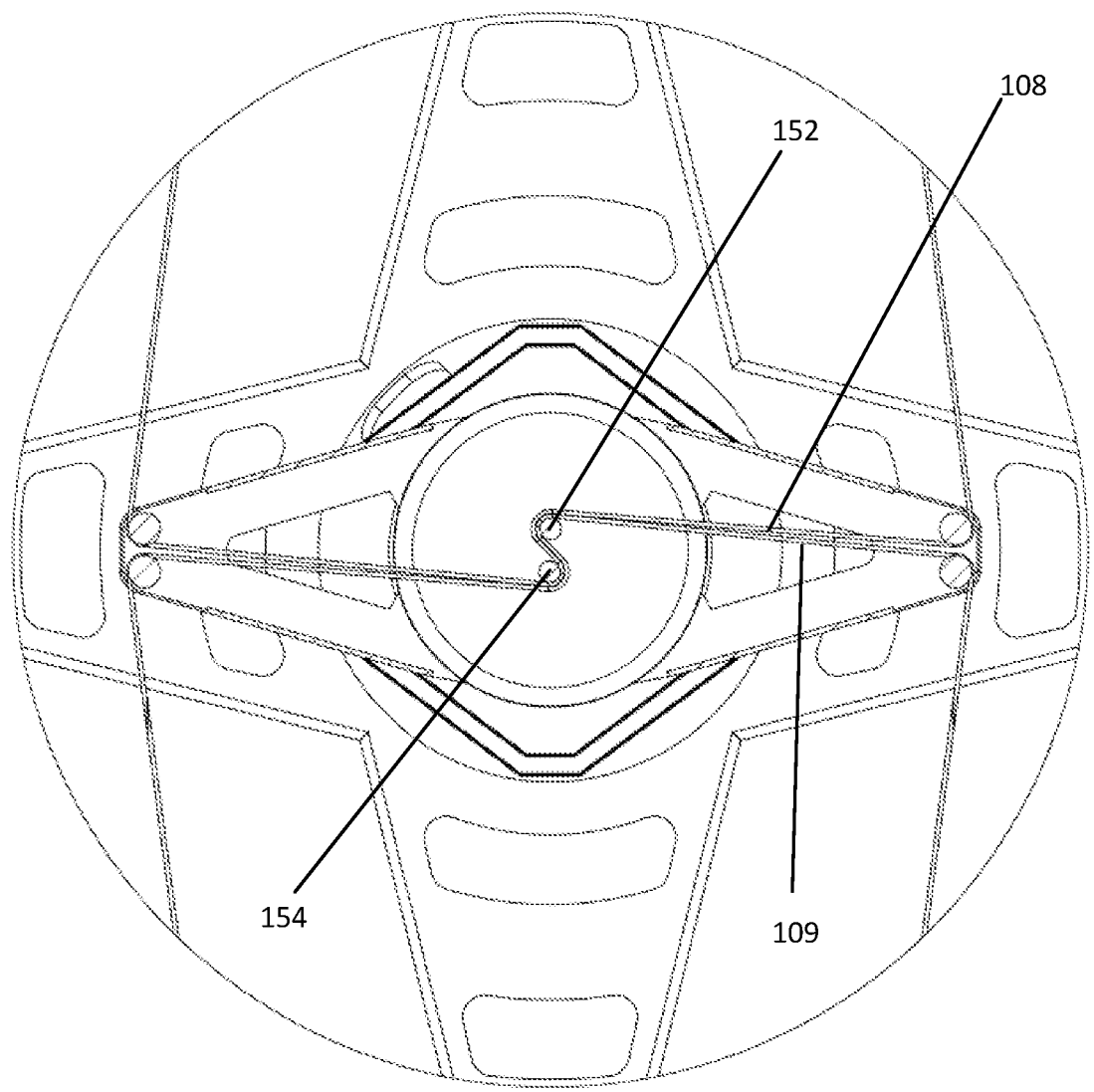

Referring now to FIGS. 2-4 collectively, the hub 136 can comprise a first armature 144 that has a first pair of fixed tether guides 148/149 and a second armature 146 that includes a second pair of fixed tether guides 150/151. Each of the armatures can have a body that is triangular in shape and is centrally hollowed to reduce its weight.

The tether guides can include components such as pulleys, rollers, protrusions, clips, pins, brackets, or any other suitable guides. In one configuration, the first tether 108 loops around tether guides 148 and 150, while second tether 109 loops around tether guides 149 and 151. The guides are used to restrict the movement of the tethers. As noted above, each of the pairs of guides are offset from a first axis A1 of the spool 138.

The spool 138 includes pins 152 and 154 are located centrally inside the spool 138 and are slightly offset from one another. For example, the pin 152 is offset to the left of a second axis A2 (also called centerline A2) of the spool 138 and the pin 154 is offset to the right of the centerline (second axis A2) of the spool 138. Each pin comprises a clip that can be used to secure and guide a tether. For example, pin 152 has a clip 153 that can be associated with the first tether 108.

The overall geometry of the hub assembly 106, including the shape and size of the armatures 144 and 146 are selected such that and end-to-end width W of the hub assembly 106 is large enough to offset the extended portions of the tethers 108/109 during rotation (when the tethers are extended). To be sure, as the width W increases, the stability of the system increases and counteracts the lengths of the tether as it extends which would tend to decrease the stability of the system. The size and shape of the hub assembly 106 affect the overall rotordynamic stability of the system 100. That is, as the tethers are unspooled, the extended portions of the tethers (the portions of the tethers that have been released from the spool 138) change the rotordynamic stability of the system 100 as they get longer or shorter. The extended portions of the tethers are measured from the spool to the payload/counterweight. The rotordynamic stability refers to the ability of a rotating system, such as a shaft or rotor (shaft 124), to maintain its steady state operation without excessive vibrations or oscillations. Any perturbations caused by imbalances in the payloads or eccentric/different lengths of the tethers may cause excessive vibrations or oscillations. The hub assembly 106 is designed to minimize the effect of any of these perturbations.

In more detail, when the system rotates, the tethers 108 and 109 are taut in the in-plane bending direction (e.g., out of plane with Gravity), and hub assembly 106 has an overall width W configured to mitigate or minimize the centripetal acceleration from causing extension of the first tether 108 that would cause the payload and counterweight to geometrically shift substantially off their original central line, which would create an increasing imbalance and drive greater loads to the bearings and amplify power losses. That is, if the first tether 108 is extended too far away from the centerline A2, this can cause imbalances that lead to rotational power loss.

The tethers 108/109 can be manufactured from a flexible laminate or braid of high-strength polymers or carbon fibers. In some embodiments, a tether used herein can be a braid of high-strength polymers or carbon fibers or a highly elastic laminate of high-strength polymers or carbon fibers. The tethers 108/109 can each be tapered from the middle to each end, along its length to maximize its structural efficiency and minimize mass. While not shown, a tether may be covered with a protective and replaceable sleeve to resist the damage inflicted by any abrasive regolith or intense direct stellar radiation that may be present in the local environment.

In some embodiments, the tethers 108 and 109 each pass between the pins 152 and 154. The pins are driven by the centripetal forces on the tether which is wrapped around the pins in certain cases. FIG. 4 illustrates how the tethers 108/109 are wrapped around the pins 152 and 154. This rotation illustrates how the tethers 108/109 are retracted and wrapped into a compact form factor. That is, the tethers 108/109 can be gathered onto the spool 138 as it rotates, which causes rotation of the pins 152 and 154 that in turn wraps the tethers around the pins 152 and 154, and onto the spool 138. Each rotation of the pins 152 and 154 gathers more of the tethers 108/109 into the spool 138. The tethers 108/109 can extend from the hub assembly 106 when the counterweight 110 and payload 112 are attached and the system is rotated. As the tethers extend outwards, they unwrap from around the pins 152 and 154, which are offset in both the hub axis and the extension axis. In some embodiments, the second drive 122 can apply forces to ensure that the tethers extend in a slow and controlled manner, in conjunction with the increase in rotational speed caused by the first drive 120.

As best illustrated in FIG. 1, the system 100 also includes docking ports 156 and 158, which are located on the hub assembly 106 in positions that are between and orthogonal to the two armatures 144 and 146. Two docking ports 156 and 158 support the counterweight 110 and payload 112 while the system is not rotating at a threshold speed. The threshold speed is a speed that is sufficient to ensure that when released, the counterweight 110 and payload 112 do not hit the surface 114 or other parts of the system. This threshold speed is sufficient to create enough centripetal force to keep the counterweight 110 and payload 112 extended and the first tether 108 sufficiently extended. Each of the docking ports, such as docking port 156, includes a receiver 160 that can releasably retain an end of the payload 112 or counterweight 110.

As best illustrated in FIG. 2, the payload 112 and the counterweight 110 have a release mechanism 162 that serves as an attachment point to the first tether 108 (the counterweight is likewise attached to the second tether 109 with another release mechanism, which is not shown but is identical to the release mechanism 162). The release mechanism 162 can also releasably mate with the receiver 160 of the docking port. Any suitable releasable attachment means can be used such as a clamp, a pin, magnets, or any other similar mechanisms. As noted above, the docking ports could support the payload/counterweight as the first drive rotates the shaft to a threshold speed which would be fast enough to create a centripetal force that would keep the payload/counterweight elevated above the surface if released from the docking ports.

Figure 5:
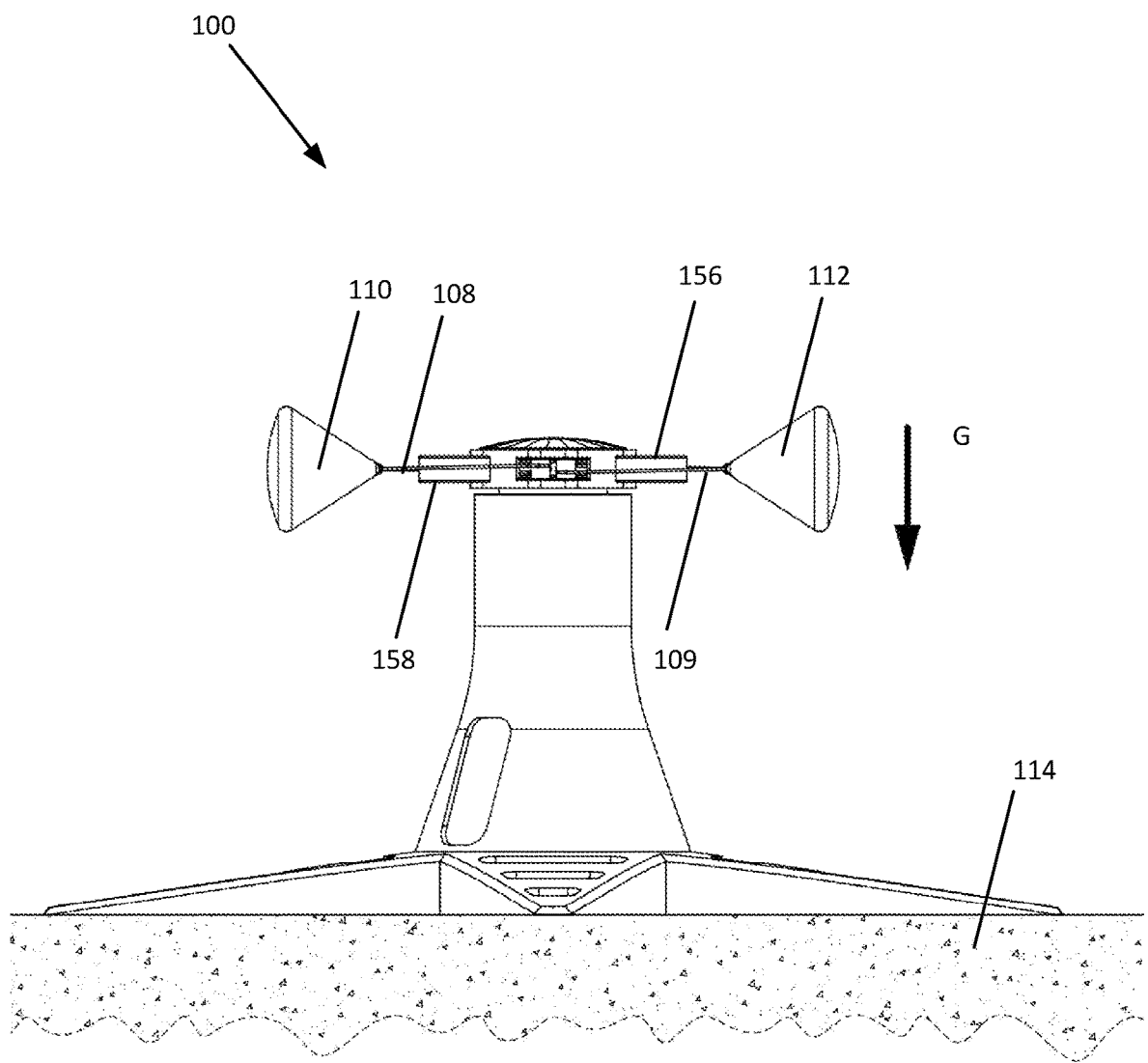
FIG. 5 illustrates an initial release of payloads from an accelerator system.

FIG. 5 illustrates the payload 112 and counterweight 110 just after detaching from their respective docking ports 156 and 158. It will be understood that Gravity G acts downwards in this example, and would pull the payload 112 and counterweight 110 towards the surface 114 but for the centripetal force created by the rotation of the system. In operation, if extended, the tethers can be spooled onto the hub assembly as discussed above. The payload 112 is attached to the first tether 108 and the counterweight 110 is attached to the second tether 109. The tethers 108/109 are retracted by the second drive 122 until the payload 112 can be connected to the docking port 156 and the counterweight 110 to the docking port 158. As noted above, any suitable method for lifting the payload/counterweight and engaging the same with their respective docking ports can be used.

FIG. 6 illustrates the system 100 (and specifically the tethers) at an unfurled/unspooled state, but before reaching launch velocity. Initially, the docking ports support the payload and the counterweight in the gravity field. At startup or system initialization, the first drive is initiated to rotate the shaft to begin accelerating the system. As the system accelerates to the minimum speed, the payload and counterweight are detached from their respective docking ports and the centripetal acceleration suspends the payload and counterweight above the surface 114 at a minimum distance D. The tethers 108/109 droop from the relatively low centripetal acceleration field but the payload and counterweight each maintain the minimum distance D. The deformed state of the armatures is representative of the stress state the tethers 108/109 may experience due to Gravity and tether weight. FIG. 7 illustrates the system at the operating velocity with the first tether 108 and the second tether 109 in a taut state.

Referring collectively to FIGS. 1-6, the second drive 122 can rotate the spool 138 to pull in a portion of a length of the tethers 108/109 by wrapping them around the pins 152 and 154, condensing it into a highly compact form factor. In an unfurling procedure, the second drive 122 provides enough torque to resist the centripetal forces pulling the tether armatures outwards, allowing them to gradually extend tether lengths in a controlled manner while the system is still rotating.

The next phase consists of a slow acceleration of the system and unspooling of the tethers. The first drive 120 accelerates the hub, shaft, and payload/counterweight, limited only by the available power. Meanwhile, the tether spool is slowly unwound by the second drive 122, allowing the centripetal acceleration to pull the payloads outwards, increasing the exposed length of the tethers 108/109. The tethers are unspooled at a rate that maintains a minimum clearance D between the end of the tether and the ground surface. This process of unfurling and accelerating will continue until the tether is fully extended. The capstan friction around the pins maintains the positional stability of the individual tether armatures. The tethers 108/109 are pulled taut and are nearly parallel to the hub assembly 106 and orthogonal to the vertical support assembly 104.

Once the tethers are fully extended, the clips that attach the tether armatures to the pins provide a minor stabilization force required to maintain alignment of the tether armatures until the hub pins become frictionally locked with the armatures. After the system is fully extended and stable, the system can continue to accelerate to the target launch velocity using the first drive 120.

The system is ready to launch as soon as the target velocity is reached. A sensor can be used to track the angular position of the payload/counterweight. As the payload/counterweight rotate to a target launch azimuth, the release mechanisms are activated, and the objects are released simultaneously. The objects then proceed on a ballistic ascent trajectory up towards apogee. If a propulsion system is on board the payload, it can ignite at any portion of the flight to either raise the orbital periapsis, achieve escape velocity, change orbital inclination, or perform any other orbital maneuver. Example launch system parameters are included in Table 1:

TABLE 1

| Parameter | Value |
| --- | --- |
| Payload mass | 100 kg |
| Vehicle mass, no boost | 1500 kg |
| Vehicle mass, with boost | 250 kg |
| Boost velocity | 1700 m/s |
| Target mission | Lunar return via NRHO |
| Mission ΔV | 3200 m/s |
| Rotation diameter | 1000 m |
| Rotation speed | 32 RPM |
| Centripetal acceleration | 590 g's |
| Launch cadence | Every 10 hours |

Figure 8:
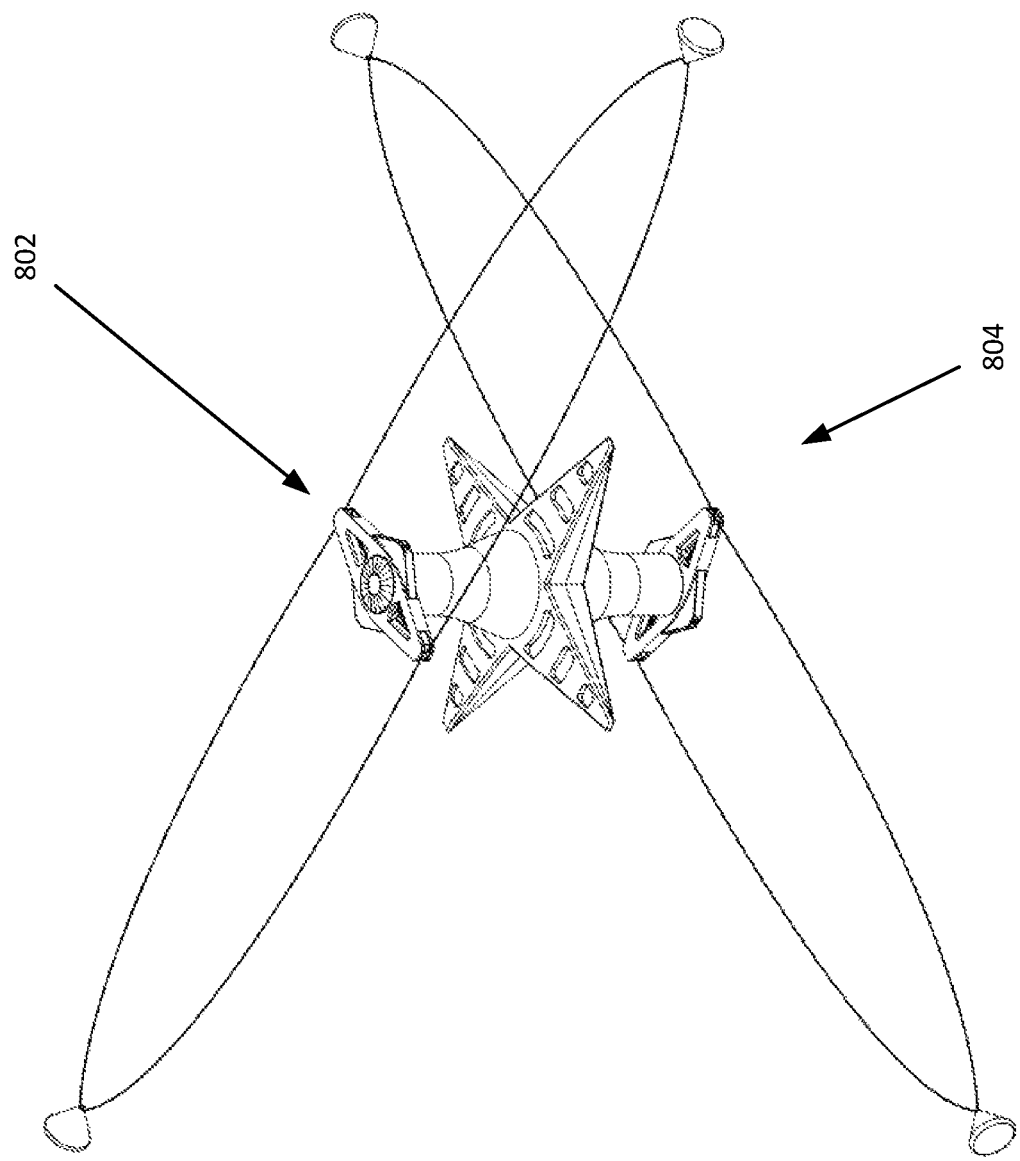
FIG. 8 illustrates an example dual accelerator system.

After release of the payload and counterweight, the first drive 120 can be inverted such that it acts as a generator, slowing the system down and recovering a large fraction of the energy stored in the rotating mass of the accelerator, storing it into either a large electrochemical energy storage bank or another accelerator. For example, FIG. 8 illustrates how two accelerators 802 and 804 in combination could operate in a microgravity environment where there is no sufficient mass anchor. The systems counter rotate and perform operations and maneuvers simultaneously to conserve momentum.

Figure 9:
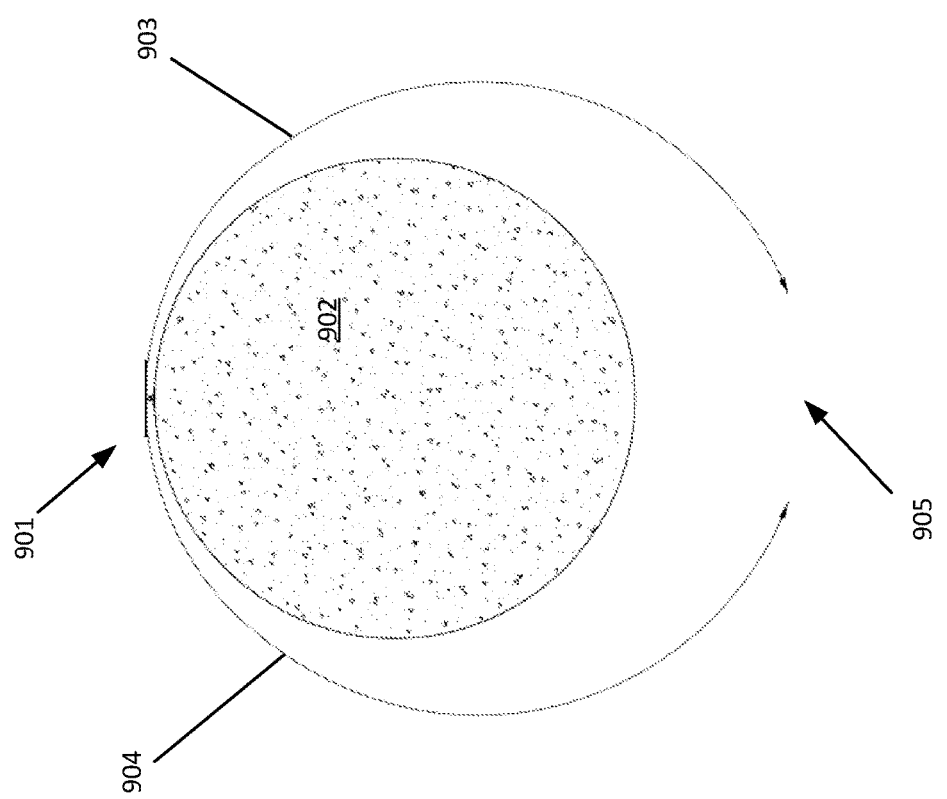
FIG. 9 illustrates the trajectory of the two launched objects relative to the accelerator and a spherical planetary body, such as the Moon.

FIG. 9 illustrates the trajectory of the two launched objects relative to the accelerator 901 and a spherical planetary body 902, such as the Moon. One object is released in a prograde orbit 903, the other is released in a retrograde orbit 904. Both objects expend some propellant to raise their apogee during the initial ascent phase. At apogee 905, the retrograde orbit can be reversed using additional propellant.

Figure 10:
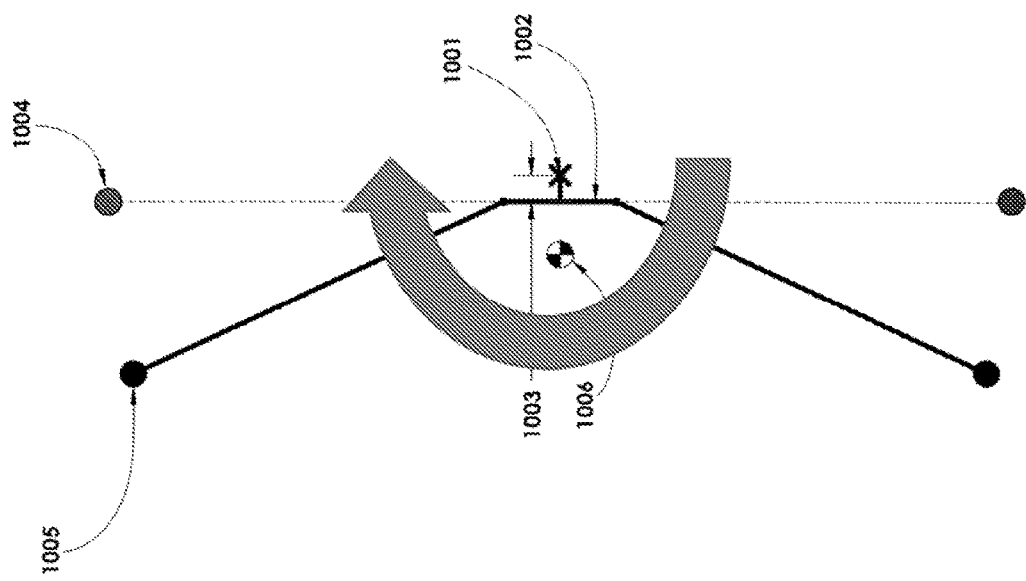
FIG. 10 is a top-down view of a typical high aspect ratio rotordynamic system and illustrates the behavior by which the ends tend to spontaneously bias themselves off-center and produce imbalances.

FIG. 10 is a top-down view of a typical high aspect ratio rotordynamic system and illustrates the behavior by which the ends tend to spontaneously bias themselves off-center and produce imbalances. Element 1001 represents the center axis of rotation of the system, while 1002 represents a simplified hub structure. Some minor perturbation off-axis represented by 1003 shifts each tether arm to become biased in the same direction of the offset due to the nature of the imposed centripetal inertial field. 1004 represents the initial position of the tip of a single arm tether before the perturbation effects shift each tether arm. In this typical low tether stiffness configuration, the ends of the tether displace out substantially to the new position represented by 1005. This displacement shifts the center of gravity of the net system 1006 outwards.

As the shaft and the mounting scheme are not infinitely rigid, this center of gravity offset will inherently cause the system to shift further from the center of rotation, exacerbating the initial perturbation and creating a feedback loop. This issue can be addressed by increasing the in-plane bending stiffness of the tether and hub system to resist the outward deflection generated by the perturbation. The two-arm system offset by the hub as proposed herein substantially increases the stiffness in this critical dimension by providing a more rigid truss structure.

It will be understood and recommended to launch objects either below the celestial body's minimum orbital velocity or above the celestial body's escape velocity. Doing so will prevent the accidental high-velocity return of uncontrolled objects malfunctioning vehicles or debris back to the launch site upon orbits.

Figure 11:
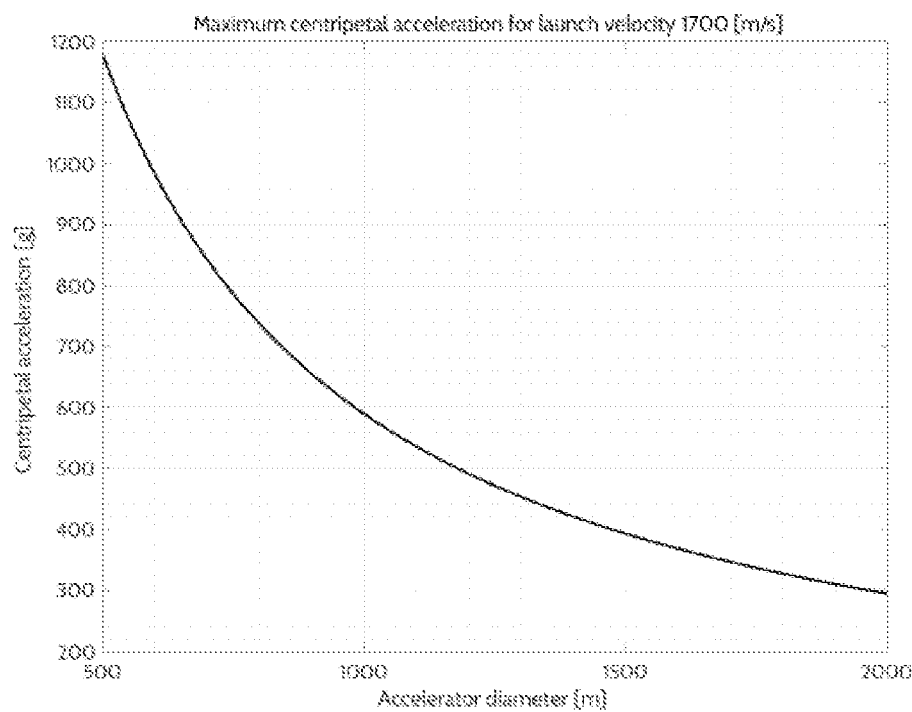
FIG. 11 is a graph that illustrates the sensitivity of the maximum centripetal acceleration at the tip as a function of rotation diameter for a specific velocity.
Figure 12:
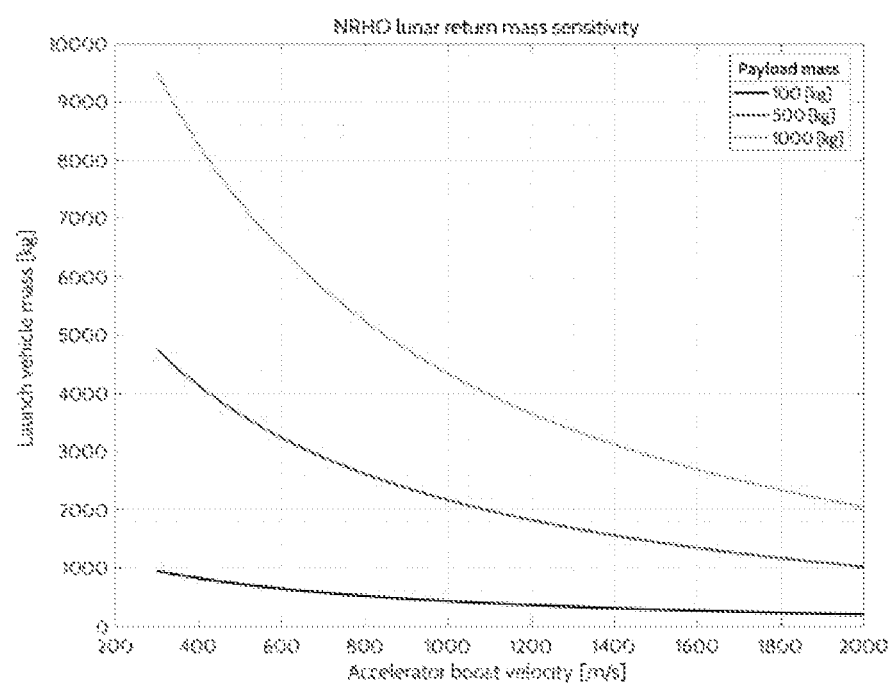
FIG. 12 illustrates the launch vehicle fuel reduction as a function of accelerator boost velocity with varying payload masses for a lunar return mission via a near rectilinear halo orbit.

FIG. 11 is a graph that illustrates the sensitivity of the maximum centripetal acceleration at the tip as a function of rotation diameter for a specific velocity. FIG. 12 illustrates the launch vehicle fuel reduction as a function of accelerator boost velocity with varying payload masses for a lunar return mission via a near rectilinear halo orbit.

Figure 13:
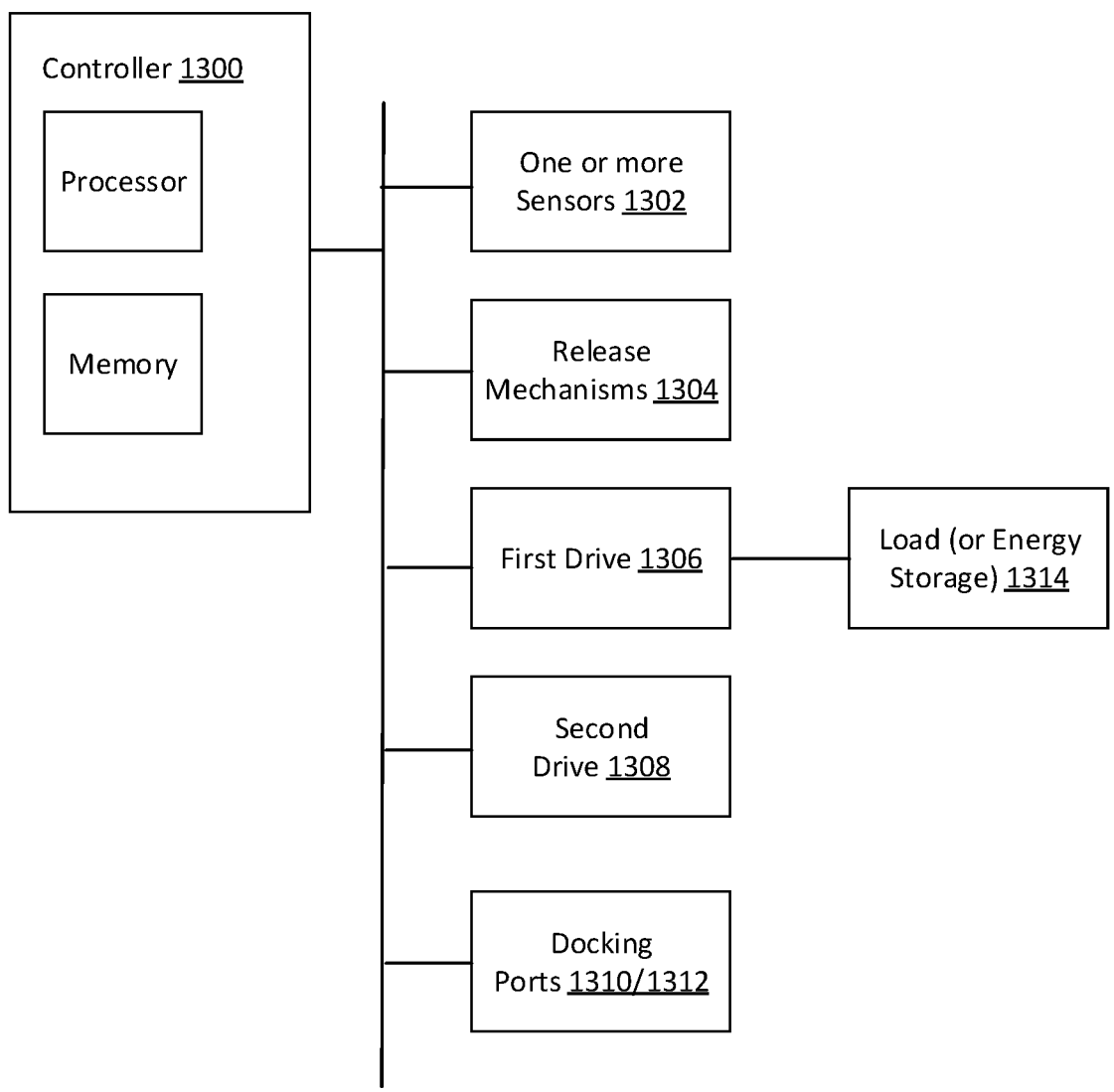
FIG. 13 is a schematic diagram of an example controller system used to control operations of an example system disclosed herein.

FIG. 13 is a schematic diagram of an example controller system used to control operations of an example system disclosed herein. A controller 1300 can include a processor and memory. The memory stores instructions that can be executed by the controller 1300 to cause elements of an example system to function. For example, the controller 1300 can be configured to receive sensor input from one or more sensors 1302 that track an angular position of a payload. An example sensor could include a standard encoder-type sensor, which could be an optical sensor. The controller 1300 can also control actuation of release mechanisms 1304 that are positioned along the tethers. As the payload/counterweight rotate to a target launch azimuth, the controller 1300 transmits a signal to the release mechanisms 1304 causing them to release the payload/counterweight. Examples of release mechanisms include, but are not limited to, latches, hooks, pins, or other mechanisms that can be toggled between retaining and releasing configurations by an actuator such as a motor, a solenoid, pneumatically, or according to other actuation means. In some embodiments, the controller 1300 is configured to track an angular position of the payloads, determine when the payloads are being rotated at the target velocity, and determine when the payloads are at a target launch azimuth.

In some examples, when the controller 1300 determines that the payload is at its target launch azimuth based on sensor data of the one or more sensors 1302, the controller 1300 sends a signal to each of the release mechanisms 1304 to actuate and release their payloads. This signal could be sent wirelessly over a short-range or long-range wireless communications link. Thus, the controller 1300 can include a communications interface that allows it to communicate with the release mechanisms 1304, which also possess wireless communication capabilities. In some instances, communication wire can be incorporated into the tethers and the controller 1300 can communicate with the release mechanisms 1304 over a direct, wired connection.

In some embodiments, the controller 1300 can be configured to control operations of the drives, such as a first drive 1306 and a second drive 1308. These drives correspond to the first and second drives disclosed above with respect to FIGS. 1-7. The controller 1300 can cause the first drive 1306 to begin rotating the system until a threshold centripetal force is reached. Again, this threshold centripetal force corresponds to a rotational rate of the system that ensures that the payloads will maintain their minimum distance above the surface when released from the docking ports. In one embodiment, the rotation rate and extended radius can be tracked simultaneously using encoders and displacement sensors.

Also, the controller 1300 can control actuation of docking ports 1310 and 1312 to release the payload/counterweight. In some instances, the controller 1300 can cause actuation of the second drive 1308 to unspool or spool the tethers during payload launch procedures and during the tethers' retraction after launch, respectively. As noted above, tethers are unspooled at a rate that maintains a minimum clearance between the end of the tethers and the ground surface during acceleration as the tethers are extended. This process of unfurling and accelerating may continue until the tethers are fully extended. Operations of the first drive 1306 can be reversed based on a signal from the controller 1300 that causes the first drive 1306 to act as a generator to provide energy that can be stored in a sink or provided to a load 1314. In one example, the controller 1300 causes the first drive 1306 to slow and capture energy available due to the current rotation of the system after payload release.

In operation, the system 100 can be initiated with both tethers in a slightly retracted state. Payloads can then be coupled to the tethers via the release mechanisms. The payloads can be loaded into position on the docking ports using any suitable mechanism. The first drive is activated to rotate the system to a threshold velocity and the payloads can be released from the docking ports once a minimum angular velocity has been reached.

The second drive can be used to assist in unspooling the tethers at a rate such that the payload does not interfere with any local objects as the payloads and tethers may droop down due to a local gravity field. Acceleration of the system increases until the speed of the payload reaches a desired launch speed and azimuth. Next, the payloads are released from the tethers. The system can be decelerated and the first drive can be used as a generator to charge an electrical storage unit or a connected load (such as another accelerator system or anything that can be run on electricity).

Figure 14:
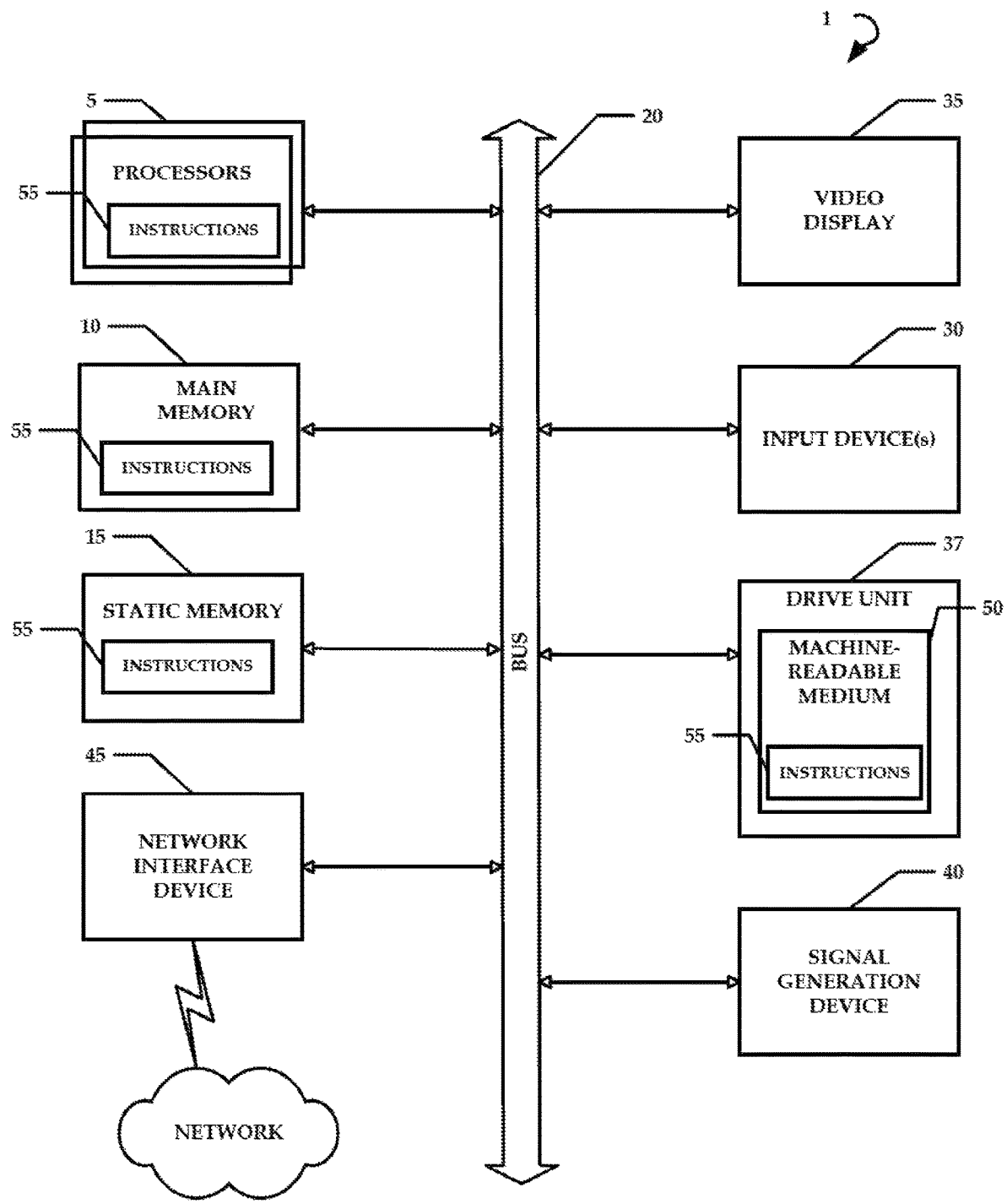
FIG. 14 is a simplified block diagram of a computing system, in accordance with some embodiments.

FIG. 14 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or decentralized) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or decentralized database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments and intermediate structures of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus systems and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" or other phrases having similar import at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term e.g., "on-demand" may be occasionally interchangeably used with its non-hyphenated version e.g., "on demand", a capitalized entry e.g., "Software" may be interchangeably used with its non-capitalized version e.g., "software", a plural term may be indicated with or without an apostrophe e.g., PE's or PEs, and an italicized term e.g., "N+1" may be interchangeably used with its non-italicized version e.g., "N+1". Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A mass accelerator system for off-world space launch, comprising:
   a base assembly that is configured to interface with a supporting surface;
   a vertical support assembly extending from the base assembly;
   a first drive positioned inside a housing of the vertical support assembly;
      a shaft positioned within the housing and connected to the first drive;
   a second drive coupled to a spool;
   a first tether and a second tether that are spooled onto and unspooled from the spool by the second drive; and
   payloads positioned on each of the tethers, the payloads being releasably coupled to the tethers in such a way that the payloads are released upon the payloads being rotated to a target launch velocity.

2. The system according to claim 1, further comprising a hub assembly that comprises laterally extending armatures that are configured to engage with the first tether and the second tether, and the hub assembly has a width that offsets portions of the first tether and the second tether when the first tether and the second tether are extended in such a way as to maximize overall rotordynamic stability of the system.

3. The system according to claim 2, wherein the hub assembly comprises pins that are located in the spool, the pins being offset from an axis of the spool.

4. The system according to claim 3, further comprising armatures on the hub assembly that comprise tether guides, the armatures being sized to maximize the rotordynamic stability of the system.

5. The system according to claim 4, wherein the first tether and the second tether are each engaged with the tether guides and run between the pins such that the first tether and the second tether is coiled around the pins when the spool is rotated by the second drive.

6. The system according to claim 1, further comprising a first release mechanism positioned on the first tether and a second release mechanism on the second tether, each of the first release mechanism and the second release mechanism being configured to receive and release a payload when the payloads are rotated to the target launch velocity.

7. The system according to claim 1, further comprising docking ports that each receive one of the payloads, the docking ports being configured to release the payloads when the payloads are rotated to a threshold velocity.

8. The system according to claim 1, further comprising an energy storage element or load that is electrically coupled to the first drive, wherein the first drive generates electrical energy as it is slowed from the target launch velocity, the electrical energy being delivered to the energy storage element or load.

9. The system according to claim 1, further comprising:
   a sensor adapted to track an angular position of the payloads; and
   a controller having a processor and memory, the controller being configured to:
      determine when the payloads are being rotated at the target velocity; and
      determine when the payloads are at a target launch azimuth based on the angular position.

10. The system according to claim 9, wherein the controller is configured to cause release mechanisms of the first tether and the second tether to release the payloads.

11. The system according to claim 9, wherein one of the payloads is a counterweight.

12. The system according to claim 9, wherein the controller is configured to:
    determine when the system is at or above a threshold velocity; and
    transmit a signal to docking ports to release the payloads when the system is at or above the threshold velocity.

13. A mass accelerator system for off-world space launch, comprising:
    a first drive coupled with a shaft;
    a hub assembly comprising a spool;
    a second drive that is located on a terminal end of the shaft and coupled to the spool;
    a first tether and a second tether that are spooled onto and unspooled from the spool by the second drive; and
    payloads coupled to each of the first tether and the second tether, the payloads being releasably coupled to the first tether and the second tether in such a way that the payloads are released upon the payloads being rotated to a target launch velocity, the hub assembly being sized to maximize overall rotordynamic stability of the system when the first tether and the second tether are extended.

14. The system according to claim 13, wherein the hub assembly comprises:
    laterally extending armatures having guides that are configured to engage with the first tether or the second tether, and the hub assembly has a width that offsets portions of the first tether and the second tether when the first tether and the second tether are extended so as to maximize the overall rotordynamic stability of the system; and
    pins that are located in the spool, the pins being offset from an axis of the spool.

15. The system according to claim 14, wherein the first tether and the second tether are engaged with the guides and run between the pins such that the first tether and the second tether coil around the pins when the spool is rotated by the second drive.

16. The system according to claim 13, further comprising:
    a first release mechanism positioned on the first tether and a second release mechanism positioned on the second tether, each of the first release mechanism and the second release mechanism being configured to receive and release a payload when the payloads are rotated to the target launch velocity; and
    docking ports that each receive one of the payloads, the docking ports being configured to release the payloads when the payloads are rotated to a threshold velocity.

17. A mass accelerator system for off-world space launch, comprising:
    a first drive coupled with a shaft;
    a hub assembly comprising a spool and docking ports, the hub assembly being coupled to a second drive that is located on a terminal end of the shaft;

a first tether;
a second tether;
a first payload that is releasably associated with the first tether;
a second payload that is releasably associated with the second tether;
a first docking port that is configured to receive the first payload;
a second docking port that is configured to receive the second payload; and
a controller having a processor and memory, the processor executing instructions stored in the memory to:
- transmit a signal to the first drive to rotate to a threshold velocity;
- determine when the first payload and the second payload are being rotated at a threshold velocity;
- cause the first docking port and the second docking port to release the first payload and the second payload when the payloads are being rotated at the threshold velocity;
- cause the second drive to unspool the first tether and the second tether from the spool;
- cause the first drive to accelerate to a target velocity;
- determine when the first payload and the second payload are being rotated at the target velocity and that the first payload and the second payload are at a target launch azimuth based on an angular position; and
- cause release mechanisms of the first tether and the second tether to release the first payload and the second payload.

18. The system according to claim 17, wherein the hub assembly comprises:
laterally extending armatures each having a pair of tether guides, wherein the first tether is looped around one tether guide of a first one of the laterally extending armatures and around another tether guide of a second one of the laterally extending armatures; and
pins that are located in the spool, the pins being offset from an axis of the spool, the first tether and the second tether extending between the pins.

19. The system according to claim 17, further comprising an energy storage device that receives energy from the first drive as it slows.

20. The system according to claim 17, wherein the controller is configured to cause the second drive to spool the first tether and the second tether onto the spool after the payloads have been launched.

* * * * *